April 14, 1925.  1,533,795
A. B. FOANS
RACE GAME
Filed July 10, 1923
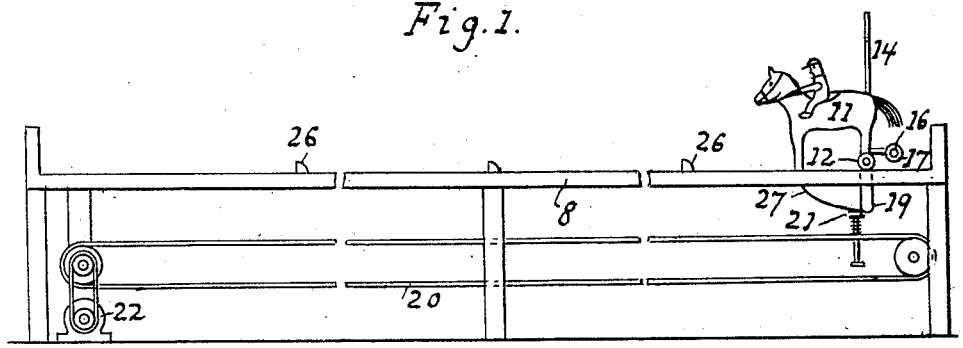
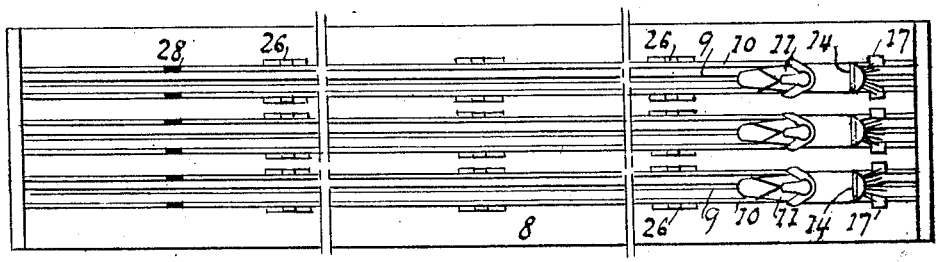
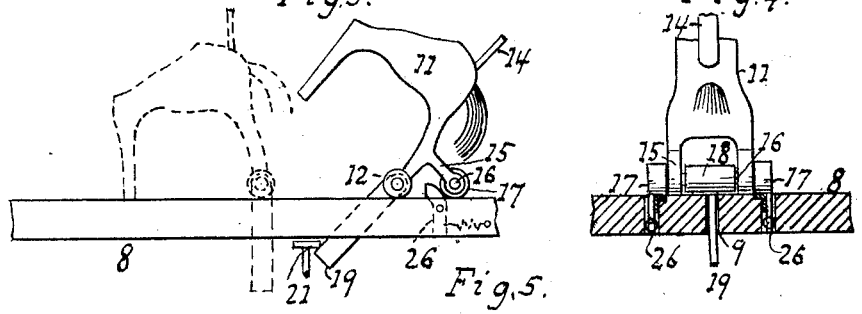
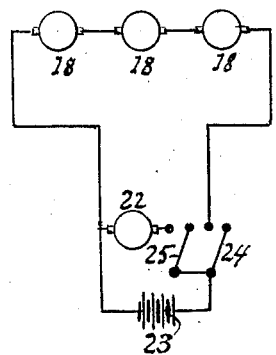
INVENTOR
Andrew B. Foans
BY
Hauff & Garland
ATTORNEYS Patented Apr. 14, 1925.

1,533,795

UNITED STATES PATENT OFFICE.

ANDREW B. FOANS, OF NEW YORK, N. Y.

RACE GAME.

Application filed July 10, 1923. Serial No. 650,574.

*To all whom it may concern:*

Be it known that I, ANDREW B. FOANS, a citizen of the United States, residing at New York, in the county of New York and State of New York, have invented new and useful Improvements in Race Games, of which the following is a specification.

This invention relates to an amusement device of the kind described in the U. S. Patent No. 1,457,901 granted to me June 5th, 1923, and it fundamentally comprehends a number of animals or carriages positioned side by side made to be propelled along a platform or the representation of a course in simulation of a horse race.

The present invention provides a target carried by a carriage and operated by the impact of a missile to control the movement of the carriage which rolls along a level platform.

The invention is designed to provide the carriage with a motor the actuation of which is automatically controlled by the position of the target.

A further object of the invention is to provide automatic means located at intervals in the path of the carriage for resetting the carriage to interrupt the operation of the motor.

The novel features of the invention are more fully described in the following specification and claims and illustrated in the accompanying drawing in which:—

Fig. 1 represents a side elevation of a game embodying this invention.

Fig. 2 is a plan view of the same.

Fig. 3 is a detail view on an enlarged scale showing the carriage in its different positions.

Fig. 4 is a rear view of the carriage showing the platform in section.

Fig. 5 is a diagram of the electrical connections.

In the drawing the numeral 8 designates a platform having a series of parallel longitudinal slots 9 formed in the platform and it has a series of tracks 10 parallel with the slots. On the platform are arranged a number of carriages 11 shaped to resemble horses or other animals to simulate a race. On the lower portion of the rear leg of each horse is mounted a pair of wheels 12 adapted to roll along the tracks. The carriage has a target 14 fixed to the back of the animal and projecting upward so that it can be seen at a distance by a person beyond the forward end of the platform.

From the rear legs project a pair of brackets 15 for journalling a shaft 16 provided with a pair of driving wheels 17 to at times engage the tracks. The shaft has mounted thereon a motor 18 as indicated in Fig. 4, which as shown is operated by electricity. A shoe 19 secured to the shaft of the pair of wheels 12 coacts with the slot to guide the carriage in a straight line. The backward movement of the carriage is accomplished by an endless belt 20 having spring pusher bars 21 and the belt is driven by a motor 22 located under the platform.

The means for operating the motors for the carriages and belt include a battery or other source of electrical energy 23 connected to switches 24 and 25 adapted to control the motors. The switches are within easy reach of the operator of the game and are employed to open or close the circuit of the carriage motors and the endless belt motor. In this device when the animals reach the end of or some are stranded along the course the operator by manipulating the switch 25 closes the circuit to motor 22 and the pusher strikes the shoe of each animal so as to propel them back to the starting point. In order to allow a pusher to pass the shoes after the carriages have been wheeled back to the starting point a cam 27 secured to the platform is provided. One of each pair of the tracks is connected to the positive pole of the battery while the other one of each can be grounded or connected to the negative pole.

When the target of any animal is hit by a ball or other article thrown by a person it rocks the animal and the wheels 17 engage the tracks as indicated in Figure 3. The driving wheels 17 are then revolved by the energization of the motor and the animals roll forward until the rear wheel hits one of a number of blocks 26 connected to the platform. Each block is pivoted to the rail so that it will swing over out of the way of the wheels when the carriage rolls backward. The front legs of the animal can be weighted to counterbalance the weight of the motor so that when the block strikes the wheels it restores the animal to its normal position with the fore feet resting on the platform. When in this position the fore feet serve as a brake to stop the movement of the carriage.

In this race the target that is hit the most frequently in its course to the finish wins the race for the horse carrying that individual target. The switch 24 can be used to open or close the circuit thereby shutting the current from the rails and the electrical energy can be supplied from a socket, electric generator or storage battery. When the carriage reaches the end of the course the driving wheels pass over the insulated section 28 of the tracks and the current is automatically shut off and the motor stops rotating.

I claim:—

1. In a game the combination with a platform, of a carriage arranged thereon, a target carried by the carriage, and means carried by the carriage operated by the position of the target for propelling the carriage.

2. In a game the combination with a platform, of a carriage arranged thereon, a target carried by the carriage, means carried by the carriage actuated by the position of the target for propelling the carriage forward, and means controlled by the operator for moving the carriage backward.

3. In a game the combination with a platform, of a carriage arranged thereon, a target carried by the carriage, a motor actuated by the position of the target for propelling the carriage forward, and means controlled by the operator for moving the carriage backward.

4. In a game the combination with a platform, of a carriage arranged thereon, a target carried by the carriage, a motor mounted on the carriage actuated by the position of the target for propelling the carriage forward, and means controlled by the operator for moving the carriage backward.

5. In a game the combination with a platform, of a rockable carriage arranged thereon, a motor mounted on the carriage actuated by the backward rock of the carriage when the target is hit for propelling the carriage forward, and a pusher controlled by the operator to move the carriage backward.

6. In a game the combination with a platform, a rockable carriage arranged thereon, a target carried by the carriage, a motor mounted on the carriage actuated by the backward rock of the carriage when the target is struck to propel it forward, means in the path of the carriage for rocking it forward to interrupt its movement, and a pusher controlled by the operator to propel the carriage backward.

7. In a game the combination with a slotted platform, of a rockable carriage having a shoe to coact with the slot for guiding the carriage, a target carried by the carriage, a motor mounted on the carriage actuated by the backward rock of the carriage when the target is struck to propel it forward, means in the path of the carriage for rocking it forward to interrupt its movement, a motor, an endless belt connected to the motor, and a pusher mounted on the belt to propel the carriage backward.

8. In a game the combination with a slotted platform, of a rockable carriage having a shoe to coact with the slot for guiding the carriage, a target carried by the carriage, a motor mounted on the carriage actuated by the backward rock of the carriage when the target is struck to propel it forward, means in the path of the carriage for rocking it forward to interrupt its movement, a motor, an endless belt connected to the motor and a pusher mounted on the belt made to engage the shoe for propelling the carriage backward.

9. In a game the combination with a slotted platform, of a rockable carriage having a shoe to coact with the slot for guiding the carriage, a target carried by the carriage, a motor mounted on the carriage actuated by the backward rock of the carriage when the target is struck to propel it forward, means in the path of the carriage for rocking it forward to interrupt its movement, a motor, an endless belt connected to the motor, a pusher mounted on the belt made to engage the shoe for propelling the carriage backward, and a cam secured to the platform for releasing the pusher from the shoe.

In testimony whereof I have hereunto set my hand in the presence of two subscribing witnesses.

ANDREW B. FOANS.

Witnesses:
MARGUERITE ALTVATER,
WILLIAM MILLER.